United States Patent [19]

Kiczek et al.

[11] Patent Number: 5,630,327
[45] Date of Patent: May 20, 1997

[54] IMMERSION FREEZER WITH BOTTOM CHAMBER SERIES OF CASCADING CONVEYOR BELTS

[75] Inventors: Edward F. Kiczek, Long Valley, N.J.; Donald J. Ehnot, Coopersburg; Richard Reider, Allentown, both of Pa.; Brian Sink, Orland Park, Ill.

[73] Assignee: Air Products and Chemicals, Inc., Allentown, Pa.

[21] Appl. No.: 611,317

[22] Filed: Mar. 5, 1996

[51] Int. Cl.⁶ .................................................. F25D 17/02
[52] U.S. Cl. .................................................. 62/374; 62/63
[58] Field of Search ........................... 62/332, 374, 63

[56] References Cited

U.S. PATENT DOCUMENTS

| | | | |
|---|---|---|---|
| 3,405,531 | 10/1968 | Davis, Jr. et al. | 62/374 |
| 3,507,128 | 4/1970 | Murphy et al. | 62/332 |
| 4,403,479 | 9/1983 | Rasovich | 62/63 |
| 5,299,426 | 4/1994 | Lemuzeaux | 62/374 |
| 5,417,074 | 5/1995 | Kiczek et al. | 62/63 |

OTHER PUBLICATIONS

Koach Freezing Systems technical brochure, "Innovation and Efficiency in Food Freezing Equipment".

*Primary Examiner*—Ronald C. Capossela
*Attorney, Agent, or Firm*—Robert J. Wolff

[57] ABSTRACT

The present invention is an immersion freezer which employs a postcooling chamber. The immersion section of the freezer initially immerses all or part of the items to be frozen (typically food items) in a bath of a liquid refrigerant to impart a crust freeze on the items, which locks in moisture and prevents clumping. The postcooling chamber, located underneath the immersion section, then uses the vaporized refrigerant from the immersion section to complete the freezing process while also maximizing efficiency. The postcooling chamber also imparts agitation to the items (which further prevents clumping) through the use of a series of cascading conveyor belts.

4 Claims, 1 Drawing Sheet

IMMERSION FREEZER WITH BOTTOM CHAMBER SERIES OF CASCADING CONVEYOR BELTS

TECHNICAL FIELD OF THE INVENTION

The present invention relates to an immersion freezer which employs a postcooling chamber containing a series of cascading conveyor belts.

BACKGROUND OF THE INVENTION

An immersion freezer which employs a postcooling chamber containing a series of cascading conveyor belts is taught in the art. Specifically, Koach Engineering & Mfg. Inc. teaches such a freezer referred to as the "Nitrogen Immersion-Vapor Freezing System" (hereinafter the "Koach freezer") in a technical brochure entitled "Innovation and Efficiency in Food Freezing Equipment". (The Koach freezer, minus the cascading conveyor belt feature, is also taught in U.S. Pat. No. 4,403,479 by Rasovich.)

The immersion section of such a freezer initially immerses all or part of the items to be frozen (typically food items) in a bath of a liquid refrigerant to impart a crust freeze on the items, which locks in moisture and prevents clumping. The postcooling chamber then uses the vaporized refrigerant from the immersion section to complete the freezing process while also maximizing efficiency. The postcooling chamber also imparts agitation to the items (which further prevents clumping) through the use of a series of cascading conveyor belts.

There is a concern with the Koach freezer, however, in that the location of the postcooling chamber relative to the immersion section is not optimal. In the Koach freezer, the postcooling chamber is located adjacent to the immersion section. Contrast this with the present invention's freezer where the post cooling chamber is located underneath the immersion section. This design difference imparts three distinct advantages to the present invention's freezer as follows:

(1) The "footprint" of the present invention's freezer will be smaller and thus the present invention's freezer will require less factory floorspace.

(2) Since both the immersion section and post cooling chamber are generally in the shape of elongated tunnels, by "stacking" the tunnels instead of having them adjacent to each other, not only is the footprint of the resulting freezer smaller but so is the exposed surface area. Since the heat leak of a freezer is proportional to the exposed surface area, this translates into less heat leak and hence better efficiency.

(3) Both the Koach freezer and the present invention's freezer exploit the fact that it is space efficient to multipass the items as they move through the postcooling chamber. The number of multipasses however quickly reaches a point of diminishing return after one two passes tie starting at one end of the postcooling chamber, moving to the opposite end to create a first "level" of cascading belts and finally returning to the starting end to create a second "level" of cascading belts) from the standpoint of heat transfer to the product and therefore efficiency. This is because it is difficult for the vaporized refrigerant from the immersion section to penetrate beyond the second level of cascading belts in the postcooling chamber. Because the Koach freezer's postcooling chamber is adjacent to the immersion section, the cascading conveyor belts in Koach's postcooling chamber are forced to multipass three times in order to have the items finish up at the exit end of the freezer. This mandates a third, largely wasted level (in terms of heat transfer) in the Koach postcooling chamber that the present invention's bottom chamber design avoids.

SUMMARY OF THE INVENTION

The present invention is an immersion freezer which employs a postcooling chamber. The immersion section of the freezer initially immerses all or part of the items to be frozen (typically food items) in a bath of a liquid refrigerant to impart a crust freeze on the items, which locks in moisture and prevents clumping. The postcooling chamber, located underneath the immersion section, then uses the vaporized refrigerant from the immersion section to complete the freezing process while also maximizing efficiency. The postcooling chamber also imparts agitation to the items (which further prevents clumping) through the use of a series of cascading conveyor belts. A key to the present invention is that the postcooling chamber is located underneath the immersion section vis-a-vis adjacent to the immersion section as in the prior art. This design difference affords several advantages to the present invention's immersion freezer including a smaller floorspace requirement and less heat leak.

DETAILED DESCRIPTION OF THE INVENTION

Figure 1:
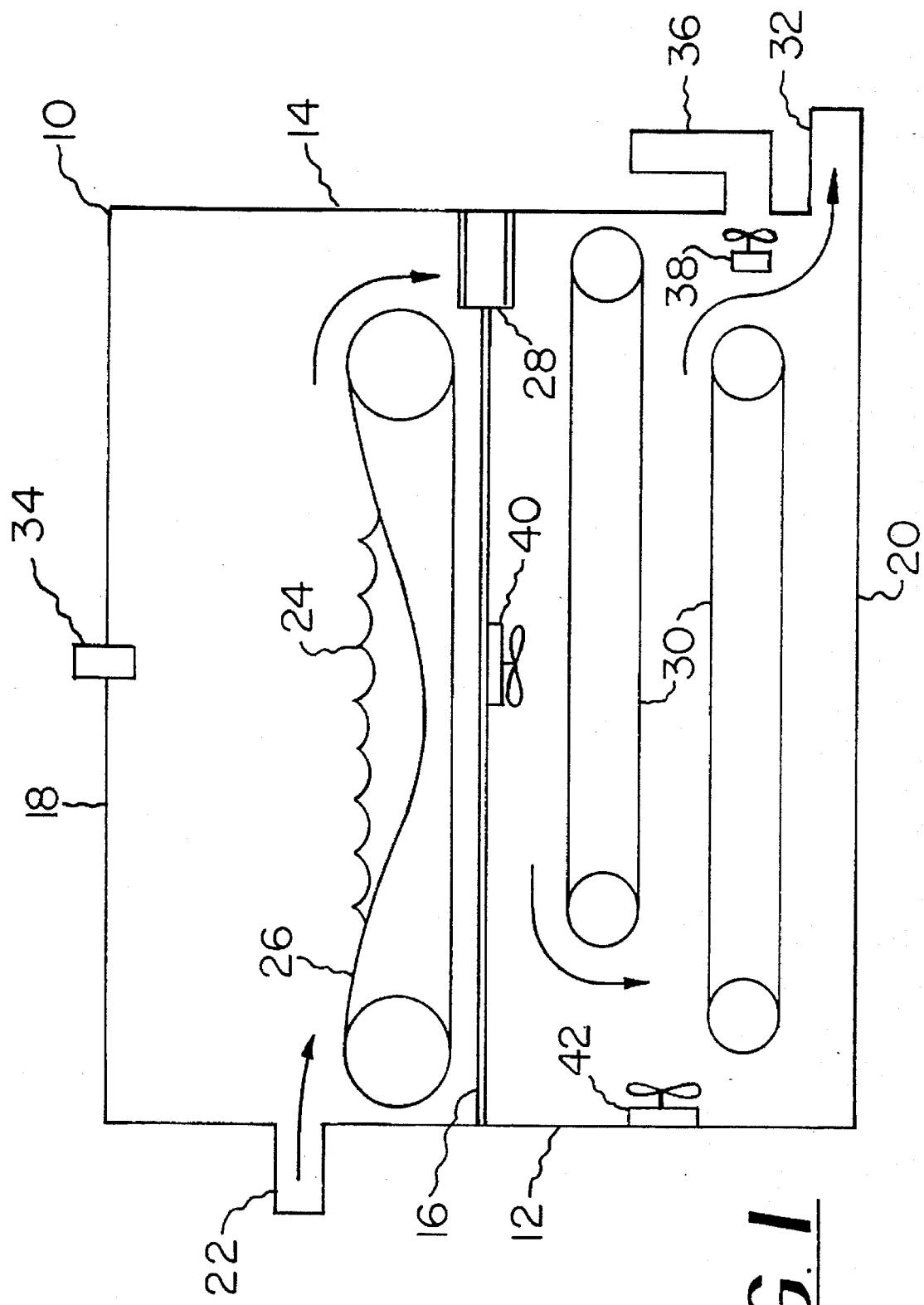
FIG. 1 is a schematic drawing of one embodiment of the present invention.

The freezer of the present invention is best illustrated with respect to a specific embodiment thereof such as FIG. 1's embodiment. FIG. 1's freezer comprises:

(a) an insulated housing 10 having a first end 12 running horizontally to a second end 14;

(b) a horizontal baffle 16 that divides said housing into a top chamber 18 and a bottom chamber 20;

(c) an item entrance port 22 located in the top chamber at or near the first end for introducing the items to be frozen into the freezer;

(d) an refrigerant bath 24 located in the top chamber for immersing all or part of the items to be frozen in a liquid refrigerant;

(e) a top chamber conveyor belt 26 for transporting the items from the item entrance port and through said refrigerant bath to the second end;

(f) a chamber transfer port 28 that pierces the horizontal baffle at or near the second end for allowing the items to drop from the top chamber conveyor belt and into the bottom chamber and for allowing vaporized refrigerant from the refrigerant bath to move into the bottom chamber;

(g) a series of cascading conveyor belts 30 located in the bottom chamber for transporting the items within the bottom chamber from the second end, to the first end, and back to the second end again wherein the initial cascading conveyor belt in said series receives the items as they drop from the top chamber conveyor belt and wherein each successive belt in said series receives the items as they drop form the preceding belt;

(h) an item exit port 32 located in the bottom of the bottom chamber at or near the second end for receiving the items as they drop from the final conveyor belt in said series of cascading conveyor belts and for subsequently withdrawing the frozen items from the freezer;

(i) at least one refrigerant admission port 34 for introducing the liquid refrigerant into the refrigerant bath;

(j) at least one refrigerant discharge port 36 for withdrawing vaporized refrigerant from the bottom chamber; and (k) at least one exhaust fan 38 for directing vaporized refrigerant from the refrigerant bath, into the bottom chamber and out the refrigerant discharge port;

(l) at least one impingement fan 40 for directing the vaporized refrigerant in the bottom chamber at a high velocity and in a direction substantially perpendicular to the movement of the items through the bottom chamber; and (m) at least one circulating fan 42 for directing the vaporized refrigerant in the bottom chamber in a direction substantially parallel to the movement of the items through the bottom chamber.

It should be noted that a preferred embodiment for the present invention's top chamber immersion section and the introduction of the liquid refrigerant into the refrigerant bath therein is as taught by U.S. Pat. No. 5,417,074 by Kiczek at al., the specification of which is hereby incorporated by reference.

It should also be noted that the number of cascading conveyor belts in the present invention's series of such belts will be a function of how much item agitation (to prevent clumping) is desired. In most cases, two belts in series will be sufficient which is the embodiment depicted in FIG. 1. In this embodiment, the initial cascading belt receives the items as they drop from the top chamber conveyor belt and transports the items from the second end to the first end while the final cascading belt receives the items as they drop from the initial cascading belt and transports the items back to the second end. Such an embodiment provides three distinct agitation points as follows: (i) the point where the items drop from the top chamber belt to the initial cascading belt; (ii) the point where the items drop from the initial cascading belt to the final cascading belt; and finally (iii) the point where the items drop from the final cascading belt to the item exit port. If more agitation is desired, the series of cascading conveyor belts can consist of a larger number of shorter belts for transporting the items within the bottom chamber from the second end, to the first end, and back to the second end again.

Finally, it should be noted that a preferred refrigerant for the present invention's freezer is nitrogen.

We claim:

1. An immersion freezer comprising:

(a) an insulated housing having a first end running horizontally to a second end;

(b) a horizontal baffle that divides said housing into a top chamber and a bottom chamber;

(c) an item entrance port located in the top chamber at or near the first end for introducing the items to be frozen into the freezer;

(d) an refrigerant bath located in the top chamber for immersing all or part of the items to be frozen in a liquid refrigerant;

(e) a top chamber conveyor belt for transporting the items from the item entrance port and through said refrigerant bath to the second end;

(f) a chamber transfer port that pierces the horizontal baffle at or near the second end for allowing the items to drop from the top chamber conveyor belt and into the bottom chamber and for allowing vaporized refrigerant from the refrigerant bath to move into the bottom chamber;

(g) a series of cascading conveyor belts located in the bottom chamber for transporting the items within the bottom chamber from the second end, to the first end, and back to the second end again wherein the initial cascading conveyor belt in said series receives the items as they drop from the top chamber conveyor belt and wherein each successive belt in said series receives the items as they drop form the preceding belt; and (h) an item exit port located in the bottom of the bottom chamber at or near the second end for receiving the items as they drop from the final conveyor belt in said series of cascading conveyor belts and for subsequently withdrawing the frozen items from the freezer.

2. The immersion freezer of claim 1 which further comprises:

(i) at least one refrigerant admission port for introducing the liquid refrigerant into the refrigerant bath;

(j) at least one refrigerant discharge port for withdrawing vaporized refrigerant from the bottom chamber;

(k) at least one exhaust fan for directing vaporized refrigerant from the refrigerant bath, into the bottom chamber and out the refrigerant discharge port;

(l) at least one impingement fan for directing the vaporized refrigerant in the bottom chamber at a high velocity and in a direction substantially perpendicular to the movement of the items through the bottom chamber; and (m) at least one circulating fan for directing the vaporized refrigerant in the bottom chamber in a direction substantially parallel to the movement of the items through the bottom chamber.

3. The immersion freezer of claim 2 wherein said series of cascading conveyor belts in the bottom chamber consists of two belts, said two belts being the initial cascading conveyor belt which receives the items as they drop from the top chamber conveyor belt and transports the items from the second end to the first end and a final cascading conveyor belt which receives the items as they drop from the initial cascading conveyor belt and transports the items back to the second end.

4. The immersion freezer of claim 3 wherein the liquid refrigerant introduced into the refrigerant bath is liquid nitrogen.

* * * * *